(12) United States Patent
Tsai et al.

(10) Patent No.: US 9,343,956 B2
(45) Date of Patent: May 17, 2016

(54) PASSIVE POWER FACTOR CORRECTION CIRCUIT, ELECTRONIC DEVICE APPLYING THE SAME AND OPERATION METHODS THEREOF

(71) Applicant: INDUSTRIAL TECHNOLOGY RESEARCH INSTITUTE, Hsinchu (TW)

(72) Inventors: Wen-Tien Tsai, Pingtung County (TW); Ching-Ran Lee, Kinmen County (TW); Po-Yen Chen, Taipei (TW); Ching-Tsai Pan, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 371 days.

(21) Appl. No.: 13/846,433

(22) Filed: Mar. 18, 2013

(65) Prior Publication Data
US 2014/0056046 A1 Feb. 27, 2014

(30) Foreign Application Priority Data
Aug. 27, 2012 (TW) .............................. 101131025 A (51) Int. Cl.
*G05F 1/70* (2006.01)
*H02M 1/42* (2007.01)

(52) U.S. Cl.
CPC ............ *H02M 1/4266* (2013.01); *Y02B 70/123* (2013.01)

(58) Field of Classification Search
CPC ....... H02M 7/10; H02M 7/103; H02M 7/106; H02M 1/20; H02M 1/22; H02M 1/30; H02M 1/32; H02M 1/4208; G05F 1/70; Y02E 40/30; H02J 3/1807

USPC ............. 363/61, 108, 125, 126; 323/206–208
See application file for complete search history.

(56) References Cited

U.S. PATENT DOCUMENTS

| 3,835,364 | A | 9/1974 | Van Rooy |
| 5,387,847 | A | 2/1995 | Wood |
| 5,986,901 | A | 11/1999 | Weng |
| 6,201,368 | B1 | 3/2001 | Webster |

(Continued)

FOREIGN PATENT DOCUMENTS

| CN | 101754550 A | 6/2010 |
| CN | 102104324 A | 6/2011 |

(Continued)

OTHER PUBLICATIONS

"Improved PFC Circuit Having Ladder Type Filter with Only Passive Devices," by Kenji Ando, et al, IEEE, No. 8, 2008, pp. 614-620.

(Continued)

*Primary Examiner* — Yemane Mehari
(74) *Attorney, Agent, or Firm* — Muncy, Geissler, Olds & Lowe, P.C.

(57) ABSTRACT

A passive power factor correction circuit includes: a DC capacitor and an input capacitor, coupled to a rectifying circuit and charged by a DC voltage from the rectifying circuit; an output capacitor, coupled to a load; first diode and a second diode, coupled to the input capacitor and the output capacitor; and an inductor, coupled to the load, the input capacitor and the output capacitor. Charging into and discharging from the DC capacitor are completed within a half cycle of an input AC voltage.

11 Claims, 5 Drawing Sheets

(56) References Cited

U.S. PATENT DOCUMENTS

| | | | |
|---|---|---|---|
| 6,414,859 B1 | 7/2002 | Zhang | |
| 6,608,770 B2 | 8/2003 | Vinciarelli et al. | |
| 6,909,622 B2 * | 6/2005 | Weng | H02M 1/425 363/126 |
| 6,998,795 B2 * | 2/2006 | Chiou | H05B 41/28 315/291 |
| 7,061,189 B2 | 6/2006 | Newman, Jr. | |
| 7,274,154 B2 | 9/2007 | Atra et al. | |
| 7,541,746 B2 | 6/2009 | Pruett | |
| 7,719,202 B2 | 5/2010 | Cheng et al. | |
| 7,821,801 B2 | 10/2010 | Janson et al. | |

FOREIGN PATENT DOCUMENTS

| | | |
|---|---|---|
| CN | 201919225 U | 8/2011 |
| JP | 9-285126 A | 10/1997 |
| JP | 201239779 A | 2/2012 |
| TW | 588530 | 5/2004 |
| TW | 200633356 | 9/2006 |
| TW | M368113 U1 | 10/2009 |

OTHER PUBLICATIONS

"Experimental Studies on Active and Passive PFC Circuits," by Yasunobu Suzuki, et al., IEEE, 1997, pp. 571-578.

"Flourescent Ballast Design Uing Passive P.F.C. and Crest Factor Control," by Peter N. Wood, IEEE, 1998, pp. 2076-2081.

"Novel Passive Soft Switching Schemes for High Power Singel Phase PFC Rectifiers," by Yan Deng, et al., IEEE, No. 2, 2002, pp. 957-961.

"Passive PFC converter for energy saving—Efficient and Cheap Diode Rectifier Topology-" by Yasuyuki Nishida, et al., IEEE, No. 11, 2011, pp. 1073-1076.

"A Novel Passive Offline LED Driver With Long Lifetime," by S.Y. (Ron) Hui, et al., IEEE Transactions on Power Electronics, vol. 25, No. 10, 2010, pp. 2665-2672.

"Design of a Single Ultra-Low-Loss Magnetic Ballast for a Wide Range of T5 High Efficiency Fluorescent Lamps," by W.M. Ng, et al., IEEE Transactions on Industrial Electronics, vol. 59, No. 4, Apr. 2012, pp. 1849-1858.

* cited by examiner

PASSIVE POWER FACTOR CORRECTION CIRCUIT, ELECTRONIC DEVICE APPLYING THE SAME AND OPERATION METHODS THEREOF

This application claims the benefit of Taiwan application Serial No. 101131025, filed Aug. 27, 2012, the disclosure of which is incorporated by reference herein in its entirety.

TECHNICAL FIELD

The disclosed embodiments relate to a passive power factor correction circuit, an electronic device applying the same, and operation methods thereof.

BACKGROUND

Due to an output filter capacitor, a substantial amount of harmonic distortion exists in an input current of a conventional bridge rectifying circuit. The harmonic distortion leads a low power factor and severe current total harmonic distortion that undesirably affect an input power. Therefore, power factor correction needs to be performed on a conventional bridge rectifying circuit.

Based on whether active switch elements are included, power factor correction circuits are categorized into two types—a passive type and an active type.

An active power factor correction circuit yields a power factor of above 0.99 and has current total harmonic distortion of less than 10%. An active power factor correction circuit further has a wide-range input voltage, a stable output voltage and small magnetic components as well as being unaffected by output power change.

In order to reduce electromagnetic interference of high-frequency components, a switching frequency of an active switch in a low-frequency power factor correction circuit is twice of the market-electricity frequency. Through changes in a cut-off time and a conduction time of a power switch, a low-frequency power factor correction circuit renders a quite satisfactory power factor. A low-frequency power factor correction circuit is advantaged by having high efficiency and simple control, requiring no high-speed power elements, and being high-frequency electromagnetic interference-free. For inverter-based household appliances, a low-frequency power factor correction circuit effectively improves the power factor and reduces current total harmonic distortion.

Although having a power factor lower than that of an active power factor correction circuit, a passive power factor correction circuit is still capable of increasing the power factor of a circuit to 0.7 to 0.9 and reducing current total harmonic distortion to below 50%. In addition, a passive power factor correction circuit, having advantages of requiring no active switch elements as well as being simple in circuit structure, low in cost and electromagnetic interference-free as it does not contain any active switch elements, is prevalent in medium-power and small-power electronic apparatuses.

SUMMARY

The disclosure is directed to a passive power factor correction circuit, an electronic device applying the same, and operation methods thereof.

According to an exemplary embodiment of the disclosure, a passive power factor correction circuit is provided. The passive power factor correction circuit includes a DC capacitor, an input capacitor, an output capacitor, a first diode, a second diode and an inductor. The DC capacitor is coupled to a rectifying circuit, and charged by a DC voltage from the rectifying circuit. The input capacitor is coupled to the rectifying circuit, and charged by the DC voltage from the rectifying circuit. The output capacitor is coupled to a load. The first diode is coupled to the input capacitor and the output capacitor. The second diode is coupled to the input capacitor and the output capacitor. The inductor is coupled to the load, the input capacitor and the output capacitor. Charging into and discharging from the DC capacitor are within a half cycle of an input AC voltage.

According to another exemplary embodiment of the disclosure, an electronic device is provided. The electronic device includes: a filter, a rectifying circuit, a passive power factor correction circuit and a load. The filter is for filtering an input AC voltage. The rectifying circuit is coupled to the filter and for rectifying the filtered input AC voltage to a DC voltage. The passive power factor correction circuit is coupled to the rectifying circuit. The load is driven by the passive power factor correction circuit. The passive power factor correction circuit includes: a DC capacitor, an input capacitor, an output capacitor, a first diode, a second diode, and an inductor. The DC capacitor is coupled to the rectifying circuit, and charged by the DC voltage from the rectifying circuit. The input capacitor is coupled to the rectifying circuit and charged by the DC voltage from the rectifying circuit. The output capacitor is coupled to the load. The first diode is coupled to the input capacitor and the output capacitor. The second diode is coupled to the input capacitor and the output capacitor. The inductor is coupled to the load, the input capacitor and the output capacitor. Charging into and discharging from the DC capacitor are within a half cycle of the input AC voltage.

According to an alternative exemplary embodiment of the disclosure, an operation method of a passive power factor correction circuit and an operation method of an electronic device are provided. The operation method is applicable to the above passive power factor correction circuit and/or the above electronic device. An input AC voltage is filtered and rectified into a DC voltage. An operating mode of the passive power correction circuit is determined according to the DC voltage. Under a first operating mode, the DC voltage charges the DC capacitor, the inductor and the output capacitor. Under a second operating mode, the DC voltage charges the DC capacitor, the input capacitor, the inductor and the output capacitor. Under a third operating mode, the DC voltage terminates charging the DC capacitor and the input capacitor, and the DC voltage and a voltage across the DC capacitor charge the output capacitor via the inductor. Under a fourth operating mode, the second diode is conducting such that the input capacitor charges the inductor and the output capacitor via the second diode.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

A passive power factor correction circuit according to one embodiment at least includes multiple capacitors, multiple diodes and at least one inductor. In the passive power factor correction circuit according to one embodiment of the disclosure, charging into and discharging from a capacitor are completed within a half cycle of an input AC voltage. At the beginning of the half cycle, the input voltage charges the capacitor. Before the half cycle ends, electric energy stored in the capacitor is transmitted and released to a load. Accordingly, not only a conduction time of the diodes is increased but also conduction current is reduced, so that a power factor of a circuit is improved and undesirable effects of the capacitor on the power factor of the circuit are also mitigated.

Figure 1:
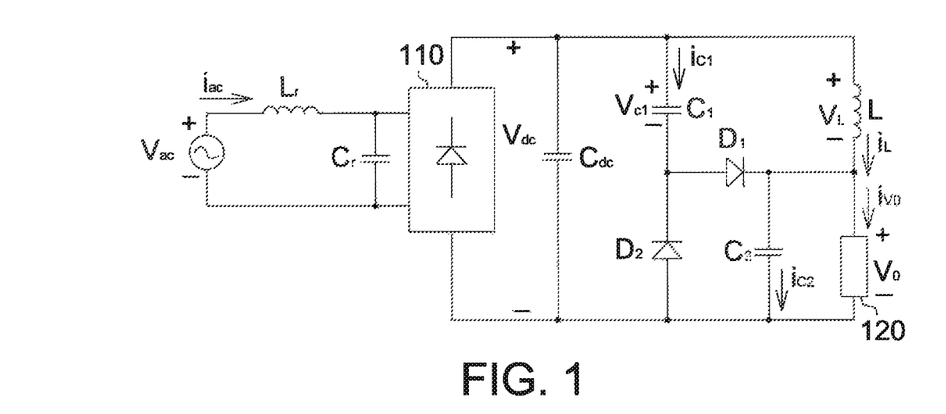
FIG. 1 is a circuit schematic diagram of an electronic device according to on equivalent circuit and signal waveforms of a passive power factor correction circuit under an operating mode 1 according to one embodiment.

FIG. 1 shows a circuit schematic diagram of an electronic device according to one embodiment. As shown in FIG. 1, the passive power factor correction circuit receives a DC voltage $V_{dc}$ generated from filtering and rectifying an input AC voltage $V_{ac}$.

A filter filters the input AC voltage $V_{ac}$. A rectifying circuit 110 is coupled to the filter, and rectifies the filtered input AC voltage $V_{ac}$ to the DC voltage $V_{dc}$. The filter includes an inductor $L_r$ and a capacitor $C_r$. The inductor $L_r$ is coupled to the input AC voltage $V_{ac}$, the capacitor $C_r$ and the rectifying circuit 110. The capacitor $C_r$ is coupled to the inductor $L_r$ and the rectifying circuit 110.

The passive power factor correction circuit, coupled to the rectifying circuit 110, includes a DC capacitor $C_{dc}$, an input capacitor $C_1$, a first diode $D_1$ and a second diode $D_2$, an inductor L, and an output capacitor $C_2$. The passive power factor correction circuit may drive a load 120.

After filtering the input AC voltage $V_{ac}$ and rectifying the filtered input AC voltage $V_{ac}$ by the rectifying circuit 110 (e.g., a bridge rectifier), the DC voltage $V_{dc}$ having double-frequency components is obtained.

The DC capacitor $C_{dc}$ is coupled to the rectifying circuit 110, and, is for example, coupled in parallel to the rectifying circuit 110. The DC capacitor $C_{dc}$ is further coupled to the input capacitor $C_1$, the first and second diodes $D_1$ and $D_2$, the inductor L, the output capacitor $C_2$ and the load 120.

During operations, the DC capacitor $C_{dc}$ may be directly charged by the DC voltage $V_{dc}$. Electric energy stored in the DC capacitor $C_{dc}$ may charge the inductor L and the capacitor $C_2$.

The input capacitor $C_1$ is coupled to the rectifying circuit 110, the DC capacitor $C_{dc}$, the first and second diodes $D_1$ and $D_2$, and the inductor L. During operations, the input capacitor $C_1$ may be directly charged by the DC voltage $V_{dc}$. Further, the electric energy stored in the input capacitor $C_1$ may charge the inductor L and the output capacitor $C_2$ via the second diode $D_2$. The input current gradually diminishes as the energy is released from the input capacitor $C_1$.

The first diode $D_1$ is coupled to the input capacitor $C_1$, the output capacitor $C_2$, the second diode $D_2$, the inductor L and the load 120. When the first diode $D_1$ is conducted, the input capacitor $C_1$ and the output capacitor $C_2$ may be charged by the DC voltage $V_{dc}$.

The second diode $D_2$ is coupled to the rectifying circuit 110, the DC capacitor $C_{dc}$, the input capacitor $C_1$, the output capacitor $C_2$, the first diode D1 and the load 120. When the second diode $D_2$ is conducted, the electric energy stored in the input capacitor $C_1$ may charge the output capacitor $C_2$ and the inductor L.

The inductor L is coupled to the rectifying circuit 110, the DC capacitor $C_{dc}$, the input capacitor $C_1$, the first diode $D_1$, the output capacitor $C_2$ and the load 120. The inductor L may be charged by the DC voltage $V_{dc}$, the DC capacitor $C_{dc}$, and/or the input capacitor $C_1$.

The output capacitor $C_2$ is coupled to the rectifying circuit 110, the DC capacitor $C_{dc}$, the first and second diodes $D_1$ and $D_2$, the inductor L and the load 120. The output capacitor $C_2$ may be charged by the DC voltage $V_{dc}$, the DC capacitor $C_{dc}$, and/or the input capacitor $C_1$.

To clearly explain operation principles of a passive power factor correction circuit according to one embodiment of the disclosure, in the description below, assume that all circuit elements are ideal, and a capacitance value of the output capacitor $C_2$ is large enough to maintain an output voltage $V_O$ approximate to a constant value. Further, assume that the load 120 is a pure resistor, for example. An operating mode of the passive power factor correction circuit may be determined according to the DC voltage $V_{dc}$. Details of operation principles of a passive power factor correction circuit according to one embodiment of the disclosure are as described below.

Operating Mode 1 (M1)

Figure 2:
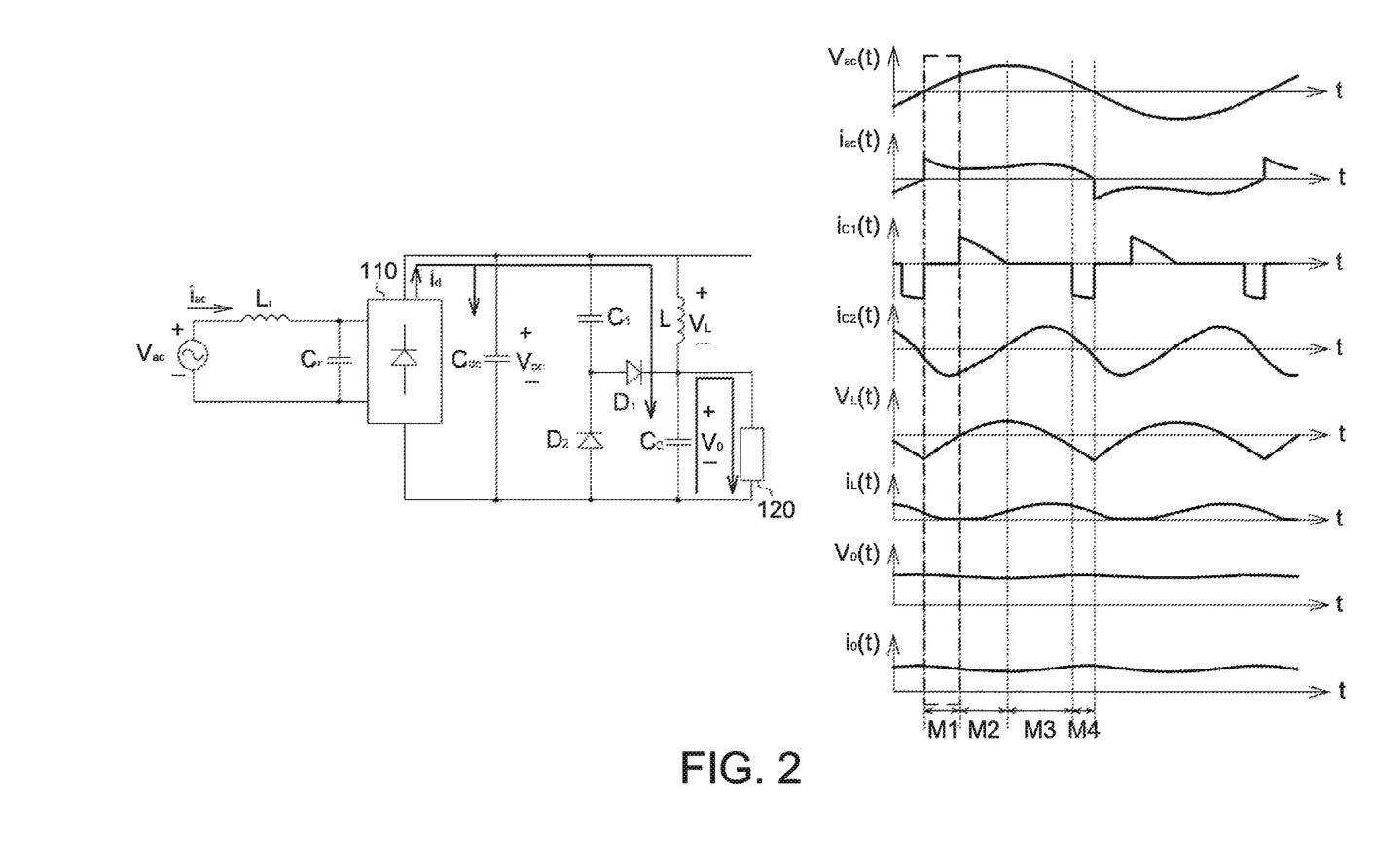

FIG. 2 shows an equivalent circuit and signal waveforms of a passive power factor correction circuit under an operating mode 1 according to one embodiment of the disclosure.

The DC voltage $V_{dc}$ increases as the input AC voltage $V_{ac}$ increases until the DC voltage $V_{dc}$ is greater than a voltage across the DC capacitor $C_{dc}$ and is also greater than a sum of a voltage across the output capacitor $C_2$ and a voltage $V_L$ of the inductor L. Under such conditions, the DC voltage $V_{dc}$ charges the DC capacitor $C_{dc}$, the inductor L and the output capacitor $C_2$.

When the passive power factor correction circuit is under the operating mode 1, status equations thereof are as shown below, where $V_m$ is a peak value of the input AC voltage $V_{ac}$, $V_O$ is an output voltage, $i_L$ is an inductor current, $i_d$ is an output current having been rectified by the rectifying circuit 110, and R is an impedance value of the load 120:

$$V_{ac} = V_m \sin\omega t \tag{1}$$

$$V_{dc} = V_m |\sin\omega t| \tag{2}$$

$$C_2 \frac{dV_o}{dt} = i_L - \frac{V_o}{R} \tag{3}$$

$$V_{dc} = L\frac{di_L}{dt} + V_o \tag{4}$$

$$i_d = C_{dc}\frac{dV_{dc}}{dt} + i_L \tag{5}$$

When the DC voltage $V_{dc}$ continues increasing to the sum of a voltage $V_{C1}$ across the input capacitor $C_1$ and the voltage across the output capacitor $C_2$, the passive power factor correction circuit enters an operating mode 2.

Operating Mode 2 (M2)

Figure 3:
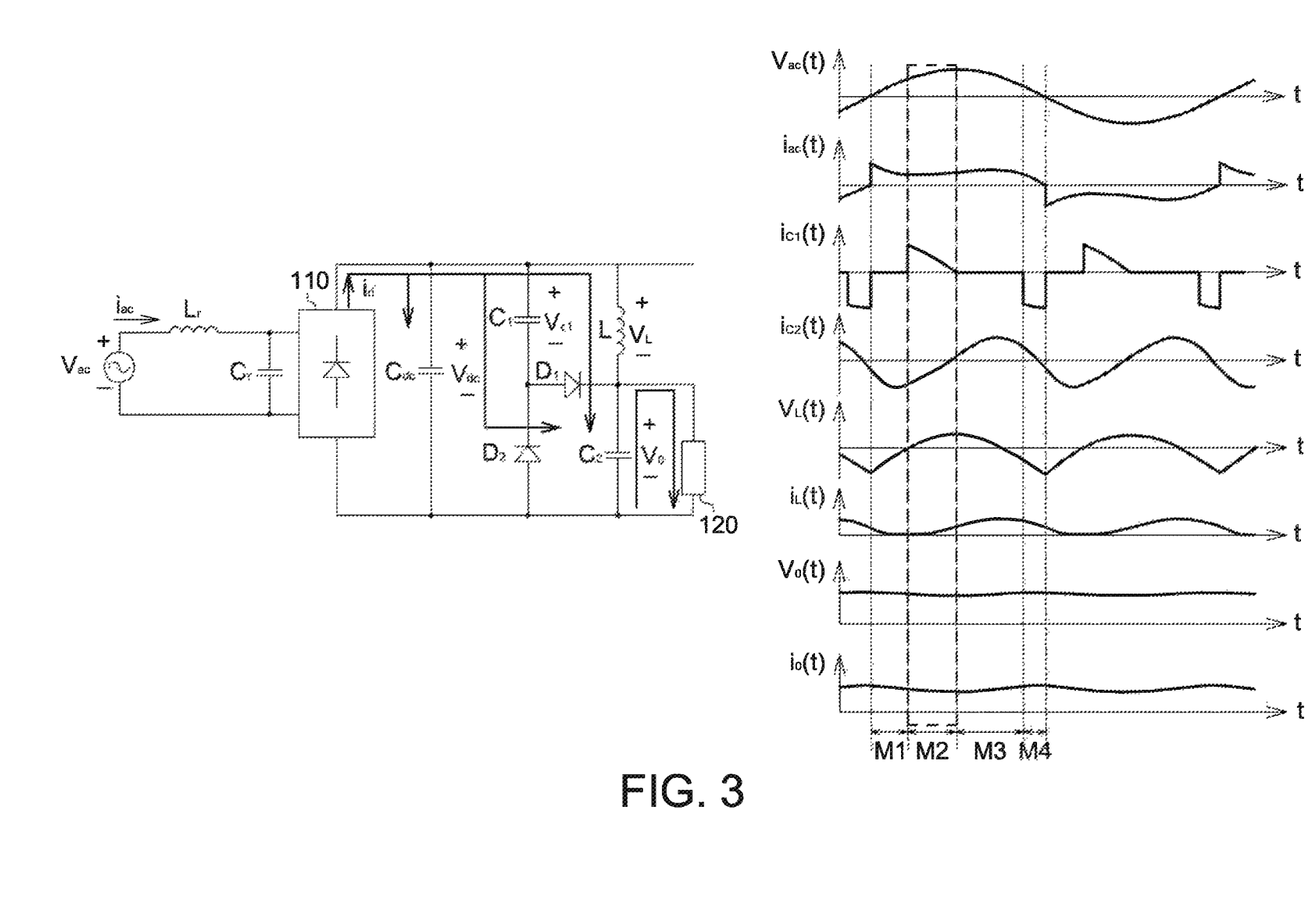
FIG. 3 is an equivalent circuit and signal waveforms of a passive power factor correction circuit under an operating mode 2 according to one embodiment.

FIG. 3 shows an equivalent circuit and signal waveforms of a passive power factor correction circuit under an operating mode 2 according to one embodiment of the disclosure.

When the DC voltage $V_{dc}$ increases to the sum of the voltage $V_{C1}$ across the input capacitor $C_1$ and the voltage across the output voltage $C_2$, the DC voltage $V_{dc}$ charges the input capacitor $C_1$ and the output capacitor $C_2$ via the first diode $D_1$. At this point, the DC voltage $V_{dc}$ charges the DC capacitor $C_{dc}$, the input capacitor $C_1$, the inductor L and the output capacitor $C_2$, with the equivalent circuit and current paths as shown in FIG. 3.

When the passive power factor correction circuit is under the operating mode 2, status equations thereof are as shown below:

$$C_2 \frac{dV_o}{dt} = C_1 \frac{dV_{c1}}{dt} + i_L - \frac{V_o}{R} \quad (6)$$

$$V_{dc} = L \frac{di_L}{dt} + V_o \quad (7)$$

$$i_d = C_{dc} \frac{dV_{dc}}{dt} + C_1 \frac{dV_{c1}}{dt} + i_L \quad (8)$$

As the input AC voltage $V_{ac}$ decreases after having reached a maximum value, the DC voltage $V_{dc}$ also decreases as the input AC voltage $V_{ac}$ decreases. Therefore, the DC voltage $V_{dc}$ becomes smaller than the sum of the voltage $V_{C1}$ across the input capacitor $C_1$ and the voltage across the output voltage $C_2$. At this point, the passive power factor correction circuit enters an operating mode 3.

Operating Mode 3 (M3)

Figure 4:
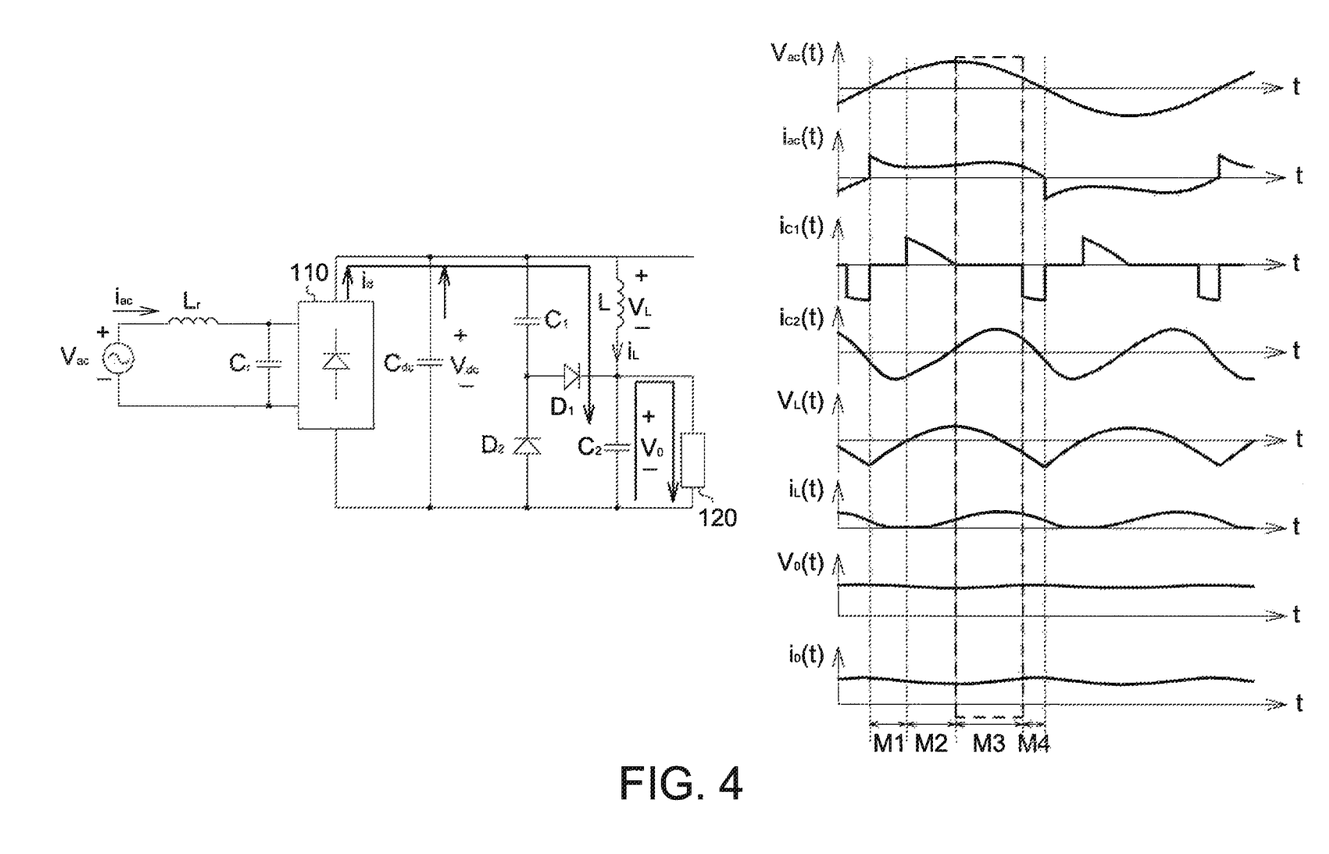
FIG. 4 is an equivalent circuit and signal waveforms of a passive power factor correction circuit under an operating mode 3 according to one embodiment.

FIG. 4 shows an equivalent circuit and signal waveforms of a passive power factor correction circuit under an operating mode 3 according to one embodiment of the disclosure.

As the input AC voltage $V_{ac}$ decreases after having reached a maximum value, the DC voltage $V_{dc}$ also decreases as the input AC voltage $V_{ac}$ decreases. Therefore, when the DC voltage $V_{dc}$ is smaller than the sum of the voltage $V_{C1}$ across the input capacitor $C_1$ and the voltage across the output voltage $C_2$, the DC voltage $V_{dc}$ stops charging the DC capacitor $C_{dc}$ and the input capacitor C1. At this point, the DC voltage $V_{dc}$ and a voltage across and the DC capacitor $C_{dc}$ pass through the inductor L to charge the output capacitor $C_2$, with the equivalent circuit and current paths as shown in FIG. 4.

It is observed from FIG. 4 that, from a perspective of discharging paths, since the DC capacitor $C_{dc}$ (which is currently discharging) and the output capacitor $C_2$ may be regarded as being coupled in series (the output capacitor $C_2$ discharges into the load 120), the passive power factor correction circuit under the operating mode 3 may be regarded as in "series discharge".

When the passive power factor correction circuit is under the operating mode 3, status equations thereof are as shown below:

$$C_2 \frac{dV_o}{dt} = i_L - \frac{V_o}{R} \quad (9)$$

$$V_{dc} = L \frac{di_L}{dt} + V_o \quad (10)$$

$$i_d - C_{dc} \frac{dV_{dc}}{dt} = i_L \quad (11)$$

When the DC voltage $V_{dc}$ is smaller than the voltage $V_{c1}$ across the input capacitor $C_1$, the passive power factor correction circuit enters an operating mode 4.

Operating Mode 4 (M4)

Figure 5:
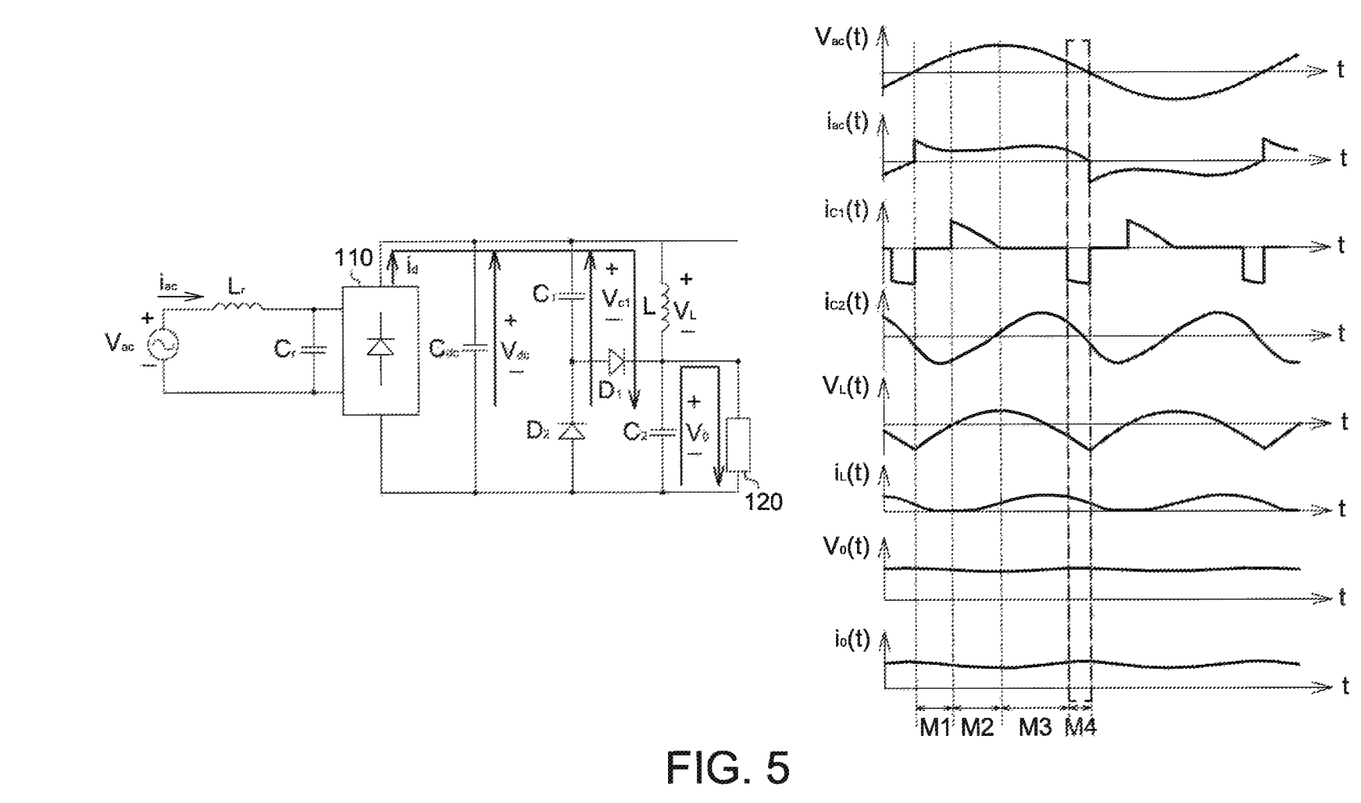
FIG. 5 is an equivalent circuit and signal waveforms of a passive power factor correction circuit under an operating mode 4 according to one embodiment.

FIG. 5 shows an equivalent circuit and signal waveforms of a passive power factor correction circuit under an operating mode 4 according to one embodiment of the disclosure.

When the DC voltage $V_{dc}$ is smaller than the voltage $V_{c1}$ across the input capacitor $C_1$, and the voltage $V_{c1}$ across the input capacitor $C_1$ is greater than the sum of the voltage across the output capacitor $C_2$ and the voltage $V_L$ of the inductor L, the second diode $D_2$ is conducted such that the input capacitor $C_1$ charges the inductor L and the output capacitor $C_2$ via the second diode $D_2$.

It is observed from FIG. 5 that, from a perspective of discharging paths, since the DC capacitor $C_{dc}$ (which is currently discharging) and the input capacitor $C_1$ may be regarded as being coupled in parallel, the passive power factor correction circuit under the operating mode 4 may be regarded as in "parallel discharge".

Therefore, according to one embodiment of the disclosure, within a half cycle (i.e., the operating mode 1 to the operating mode 4) of the input AC voltage $V_{ac}$, the passive power factor correction circuit changes from series discharge to parallel discharge to thereby eliminating ripples.

When the voltage across the DC capacitor $C_{dc}$ is smaller than the sum of the voltage across the output capacitor $C_2$ and the voltage $V_L$ of the inductor L, the passive power factor correction circuit completes one charge-discharge cycle of the DC capacitor $C_{dc}$ (i.e., a half cycle of the input AC voltage $V_{ac}$).

When the passive power factor correction circuit is under the operating mode 4, status equations thereof are as shown below:

$$C_2 \frac{dV_o}{dt} = i_L - \frac{V_o}{R} \quad (9)$$

$$V_{dc} = L \frac{di_L}{dt} + V_o \quad (10)$$

$$C_{dc} \frac{dV_{dc}}{dt} + C_1 \frac{dV_{c1}}{dt} = -i_L \quad (11)$$

It is concluded from the above descriptions that, before a half of an operating cycle of the input AC voltage ends, the electric energy stored in the DC capacitor $C_{dc}$ is transferred and discharged to the load 120. Therefore, it is seen from the above waveforms that, the input power may charge the DC capacitor $C_{dc}$ at the beginning of a second half of the operating cycle of the input AC voltage. Not only the conduction time of the rectifying diodes can be increased but also the conduction current is decreased, so that the power factor of the circuit is improved and undesirable effects of the capacitor on the power factor of the circuit are also mitigated.

According to another embodiment of the disclosure, an electronic device is provided. The electronic device includes the above passive power factor correction circuit, a filter, a rectifying circuit and a load. Details of the electronic device can be referred to in the above descriptions, and shall be omitted herein.

According to another embodiment of the disclosure, an operation method of a passive power factor correction circuit is provided. According to yet another embodiment of the disclosure, an operation method of an electronic device is provided. An input AC voltage is filtered and rectified to obtain a DC voltage. An operating mode of the passive power factor correction circuit is determined according to the DC voltage. Details of determining the operating mode of the passive power factor correction circuit can be referred to in the above descriptions, and shall be omitted herein. Further, operation details of the passive power factor correction circuit under different operating mode are also as described above, and shall be omitted herein.

In a passive power factor correction factor according to one embodiment of the disclosure, the input power or the input voltage can be changed by changing the conduction time of the circuit, and the output power or the output voltage can be changed by changing the frequency of the input AC voltage. The time constants can be changed by changing the capacitance values of the capacitors, so that the charging/discharging time of the capacitors can be a desired value. The time constants can be changed by changing the inductance value of the inductor, so that the charging/discharging time of the inductor can be a desired value.

It is demonstrated by descriptions of the embodiments that, the passive power factor correction circuit is unlikely affected by the input voltage, the frequency of the input voltage and the output power, and is thus capable of maintaining a highly satisfactory power factor correction effect.

The passive power factor correction circuit according to one embodiment of the disclosure features high efficiency (e.g., 95.5%), a high power factor (e.g., 0.92), a high resource recycle rate and a long lifespan.

As the passive power factor correction circuit according to one embodiment of the disclosure does not include active switch elements, electromagnetic interference resulted by active switch elements can be mitigated.

Further, as the passive power factor correction circuit according to one embodiment of the disclosure does not include electrolytic capacitors, a lifecycle of the circuit can be prolonged.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A passive power factor correction circuit, comprising:
   a DC (direct current) capacitor, coupled to a rectifying circuit, and charged by a DC voltage from the rectifying circuit;
   an input capacitor, coupled to the rectifying circuit, and charged by the DC voltage from the rectifying circuit;
   an output capacitor, coupled to a load;
   a first diode, coupled to the input capacitor and the output capacitor;
   a second diode, coupled to the input capacitor and the output capacitor; and
   an inductor, coupled to the load, the input capacitor and the output capacitor;
   wherein, electric energy stored in the DC capacitor is discharged within a half cycle of an input AC voltage, and
   wherein within every half cycle of the input AC voltage, the passive power factor correction circuit sequentially works in a parallel charging operating mode, a parallel charging and serial charging operating mode, a serial discharging operating mode and a parallel discharging operating mode.

2. The passive power factor correction circuit according to claim 1, wherein the input AC voltage is filtered by a filter and rectified by the rectifying circuit to the DC voltage.

3. An operation method of a passive power factor correction circuit, the operation method comprising:
   filtering and rectifying an input AC voltage to obtain a DC voltage;
   determining an operating mode of the passive power factor correction circuit according to the DC voltage;
   under a first operating mode which is a parallel charging operating mode, the DC voltage charging the DC capacitor, the inductor and the output capacitor;
   under a second operating mode which is a parallel charging and serial charging operating mode, the DC voltage charging the DC capacitor, the input capacitor, the inductor and the output capacitor;
   under a third operating mode which is a serial discharging operating mode, the DC voltage terminating charging the DC capacitor and the input capacitor, and the DC voltage and a voltage across the DC capacitor charging the output capacitor via the inductor; and
   under a fourth operating mode which is a parallel discharging operating mode, conducting the second diode such that the input capacitor charges the inductor and the output capacitor via the second diode,
   wherein within every half cycle of the input AC voltages, the passive power factor correction circuit sequentially works in the parallel charging operating mode, the parallel charging and serial charging operating mode, the serial discharging operating mode and the parallel discharging operating mode.

4. The operation method according to claim 3, wherein under the first operating mode, the DC voltage increases as the input AC voltage increases until the DC voltage is greater than the voltage across the DC capacitor and is also greater than a sum of a voltage across the output capacitor and a voltage of the inductor.

5. The operation method according to claim 4, wherein when the DC continues increasing to a sum of a voltage across the input capacitor and the voltage across the output capacitor, the passive power factor correction circuit enters the second operating mode.

6. The operation method according to claim 5, wherein under the second operating mode, the DC voltage continues increasing to the sum of the voltage across the input capacitor and the voltage across the output capacitor.

7. The operation method according to claim 6, wherein when the DC voltage is smaller than the sum of the voltage across the input capacitor and the voltage across the output capacitor, the passive power factor correction circuit enters the third operating mode.

8. The operation method according to claim 7, wherein under the third operating mode, the DC voltage is smaller than the sum of the voltage across the input capacitor and the voltage across the output capacitor.

9. The operation method according to claim 8, wherein when the DC voltage is smaller than the voltage across the input capacitor, the passive power factor correction circuit enters the fourth operating mode.

10. The operation method according to claim 9, wherein under the fourth operating mode, the DC voltage is smaller than the voltage across the input capacitor, and the voltage across the input capacitor is greater than the sum of the voltage across the output capacitor and the voltage of the inductor.

11. The operation method according to claim 10, wherein when the voltage across the DC capacitor is smaller than the sum of the voltage across the output capacitor and the voltage of the inductor, the passive power factor correction circuit completes a charging/discharging cycle of the DC capacitor.

* * * * *